(12) United States Patent
Haugen et al.

(10) Patent No.: US 11,936,174 B2
(45) Date of Patent: Mar. 19, 2024

(54) DEVICE FOR MANIPULATING MOVEMENT OF AN OVERHEAD POWER LINE

(71) Applicant: A&M Utvikling AS, Alta (NO)

(72) Inventors: Andreas Fors Haugen, Alta (NO); Magnus Haugen, Alta (NO)

(73) Assignee: A&M Utvikling AS, Alta (NO)

( * ) Notice: Subject to any disclaimer, the term of this patent is extended or adjusted under 35 U.S.C. 154(b) by 434 days.

(21) Appl. No.: 17/282,149

(22) PCT Filed: Oct. 11, 2019

(86) PCT No.: PCT/EP2019/077593
§ 371 (c)(1),
(2) Date: Apr. 1, 2021

(87) PCT Pub. No.: WO2020/088912
PCT Pub. Date: May 7, 2020

(65) Prior Publication Data
US 2021/0359501 A1    Nov. 18, 2021

(30) Foreign Application Priority Data
Oct. 30, 2018   (NO) .................................. 20181394

(51) Int. Cl.
*H02G 7/14*       (2006.01)
*H02G 7/16*       (2006.01)

(52) U.S. Cl.
CPC ................. *H02G 7/14* (2013.01); *H02G 7/16* (2013.01)

(58) Field of Classification Search
CPC .................................... H02G 7/14; H02G 7/16
See application file for complete search history.

(56) References Cited

U.S. PATENT DOCUMENTS

| 6,660,934 B1 | 12/2003 | Nourai et al. |
| 2004/0065458 A1 | 4/2004 | Hansen |
| (Continued) | | |

FOREIGN PATENT DOCUMENTS

| CA | 2618505 A1 | 3/2007 |
| CN | 104065015 A | 9/2014 |
| (Continued) | | |

OTHER PUBLICATIONS

CN 106410724 A Translation (Year: 2023).*
(Continued)

*Primary Examiner* — Timothy J Thompson
*Assistant Examiner* — John B Freal
(74) *Attorney, Agent, or Firm* — Osha Bergman Watanabe & Burton LLP

(57) ABSTRACT

A device to be attached to an overhead power line for the purpose of manipulating movement of the overhead power line comprises an electric power source; a base, defining a base plane; and a clamp, secured to the base, to be attached to a section of the overhead power line. The device further comprises a flywheel, having a rotational axis; an actuator, arranged to adjust the rotational axis of the flywheel in dependency of an actuator control signal; and an electric motor, arranged to rotate the flywheel about the rotational axis in dependency of a motor control signal. The device further comprises an acceleration sensing device, secured to the base, providing an acceleration signal; and a controller device, arranged to receive the acceleration signal and to provide the motor control signal and the actuator control signal. The controller device is configured to operate in an overhead power line stabilizing mode. In the overhead power stabilizing mode, the controller device calculates the motor control signal and the actuator control signal in dependency of the acceleration signal in such a way as to (Continued)

minimize the acceleration signal. Advantageously, the controller device is also configured to operate in in an ice removal mode. In the ice removal mode, the controller device calculates the motor control signal and the actuator control signal in dependency of the acceleration signal in such a way as to cause fluctuations in the acceleration measured by the acceleration sensing device.

12 Claims, 4 Drawing Sheets

(56) References Cited

U.S. PATENT DOCUMENTS

| | | |
|---|---|---|
| 2004/0159453 A1 | 8/2004 | Shirmohamadi |
| 2010/0243633 A1* | 9/2010 | Huynh ............... H02G 7/16 219/209 |
| 2014/0136140 A1* | 5/2014 | Chan ................ H02G 7/14 702/141 |

FOREIGN PATENT DOCUMENTS

| | | | |
|---|---|---|---|
| CN | 105244831 A | | 1/2016 |
| CN | 106410724 A | * | 2/2017 |
| WO | 0247232 A1 | | 6/2002 |

OTHER PUBLICATIONS

Search Report issued in Norwegian Application No. 20181394; dated May 16, 2019 (2 pages).
International Search Report issued in International Application No. PCT/EP2019/077593, dated Dec. 18, 2019 (4 pages).
Written Opinion issued in International Application No. PCT/EP2019/077593; dated Dec. 18, 2019 (6 pages).

* cited by examiner

DEVICE FOR MANIPULATING MOVEMENT OF AN OVERHEAD POWER LINE

TECHNICAL FIELD

The invention relates to a device to be attached to an overhead power line for the purpose of manipulating movement of the overhead power line.

BACKGROUND

Overhead power line arrangements are structures widely used in transmitting and distributing electric power, typically along large distances. A power line arrangement includes a number of power lines or conductors, usually three or multiples of three, which are suspended by towers, pylons or poles arranged at intervals along the power lines.

Power lines are exposed to various external forces and environmental influence, such as meteorological phenomena.

For instance, excessive wind will tend to cause movement of the power lines. High-amplitude, low frequency oscillation of power lines due to wind is known as power line galloping. Movement due to wind, an in particular galloping, can be dangerous and destructive to the power lines and may lead to costly disruption in service.

Power lines are also exposed to icing, which is particularly noticeable in polar geographical areas. Formation of ice on the power lines may cause heavy loads on the conductors and may likewise lead to damage and costly disruption in service.

Hence, there is a general need for devices that will alleviate problems caused by external forces and environmental influence on power lines, including wind and ice.

CN-104065015 describes an external excitation resonance type automatic anti-icing and de-icing robot system. The system includes a vibration execution module, an online electricity taking module, an automatic monitoring module, a control analysis module, a resonance feedback module, a fixing locking module and a wireless remote control module. The vibration execution module is controlled by the control analysis module to generate mechanical vibration with the same frequency as the inherent frequency of a current electricity transmission line. In the de-icing process, the resonance feedback module measures the resonance situation in real time, the vibration frequency of the vibration execution module is continuously tracked and adjusted through the control analysis module, and the de-icing efficiency and effect are kept.

WO-02/47232 A1 relates to an operatively controllable electromechanical vibrator which is attached semi-permanently on a line section between pylons in order to remove snow and ice from an overhead line. A snow/ice sensor is arranged close by the vibrator, and the vibrator is driven from a current transformer mounted close by for inductive tapping of power from the power line.

CN-105244831 discloses a smart shockproof hammer for reducing vibration or galloping of overhead power lines. Data collected by a triaxial acceleration sensor are processed in a processor, which controls a motor to perform the active reverse movement of the hammer to achieve the shock protection effect.

U.S. Pat. No. 6,660,934 B1 relates to a mechanical ice-shedding device for temporary or permanent attachment to a suspended power line. The ice-shedding device uses a motor to move at least one unbalanced weight, thereby causing a vibration of the device that is translated to the cable to which the device is attached. The vibration causes an oscillation of the cable which is sufficient to substantially shed ice that has accumulated thereon. The output of the motor is preferably regulated so that the cable may be ramped through several frequencies of oscillation, thereby improving its ice-shedding ability. The device may be driven by power from the power line to which it is attached, or from another source, such as a battery or storage capacitor.

SUMMARY

The invention relates to a device to be attached to an overhead power line for the purpose of manipulating movement of the overhead power line, where the device comprises:
  an electric power source;
  a base, defining a base plane;
  a clamp, secured relatively to the base, to be attached to a section of the overhead power line;
  a flywheel, having a rotational axis;
  an actuator, arranged to adjust the rotational axis of the flywheel in dependency of an actuator control signal;
  an electric motor, arranged to rotate the flywheel about the rotational axis in dependency of a motor control signal;
  an acceleration sensing device, secured relatively to the base, providing an acceleration signal; and
  a controller device, arranged to receive the acceleration signal and to provide the motor control signal and the actuator control signal, the controller device being configured to:
  in an overhead power line stabilizing mode, calculating the motor control signal and the actuator control signal in dependency of the acceleration signal in such a way as to minimize the acceleration signal.

In one aspect, the controller device is further configured to:
  in an ice removal mode, calculating the motor control signal and the actuator control signal in dependency of the acceleration signal in such a way as to cause fluctuations in the acceleration measured by the acceleration sensing device; where the ice removal mode is different from the overhead power line stabilizing mode.

Hence, the controller device may be configured to be in different modes, dependent on signals from the sensing devices, a timer etc. In a first period of time, for example determined by the timer or signals from the sensing devices, the controller device is configured to be in the overhead power line stabilizing mode. This will be the case most of the time. However, in a second period of time, different from the first period of time, the controller device may be configured to be in the ice removal mode. Hence, the controller device can have several different modes—but the controller device is not in different modes at the same time.

In one aspect, the device comprises one flywheel, one electric motor and one actuator.

In one aspect, the device comprises two flywheels, two respective electric motors and two respective actuators.

In one aspect, the device comprises an external housing, the clamp being arranged on an upper part of the external housing.

In one aspect, the clamp includes a locking device configured to lock the device to the overhead power line, the locking device including a locking actuator which is controllable by the controller device.

In one aspect, the acceleration sensing device includes a 3-axis accelerometer or a 3-axis gyroscope.

In one aspect, the electric power source includes an inductive coupler, arranged to provide electric power from AC carried by the overhead power line, and a power converter.

In one aspect, the electric power source further comprises a rechargeable battery device.

In one aspect, the device comprises a communication device connected to the controller device, providing wireless communication with a base station.

In one aspect, the device comprises a temperature sensor device in the clamp, arranged to measure a temperature of the overhead power cable, and wherein the controller device is arranged to receive a temperature signal from the temperature sensor device.

In one aspect, the device comprises an ice formation detector, and wherein the controller device is arranged to receive an ice formation detector signal from the ice formation detector.

In one aspect, the device comprises a distance measurement device, measuring a vertical distance between the device and the ground, and wherein the controller device is arranged to receive a distance measurement signal from the distance measurement device.

BRIEF DESCRIPTION OF THE DRAWINGS

Exemplary embodiments of the present invention will become more fully understood from the detailed description below and the accompanying drawings. The drawings are given by way of illustration only, thus, they are not limiting on the present invention. Throughout the drawings, like reference numerals represent like elements.

DETAILED DESCRIPTION

The present invention is directed to a device to be attached to an overhead power line for the purpose of manipulating movement of the overhead power line. The following description presents exemplary embodiments of such devices and various aspects thereof that are consistent with the principles of the invention. It must be noted that the exemplary embodiments are intended to provide a better understanding of the invention, and that they should not be interpreted as limitations to the invention. The scope of the invention is defined by the appended claims.

Figure 1:
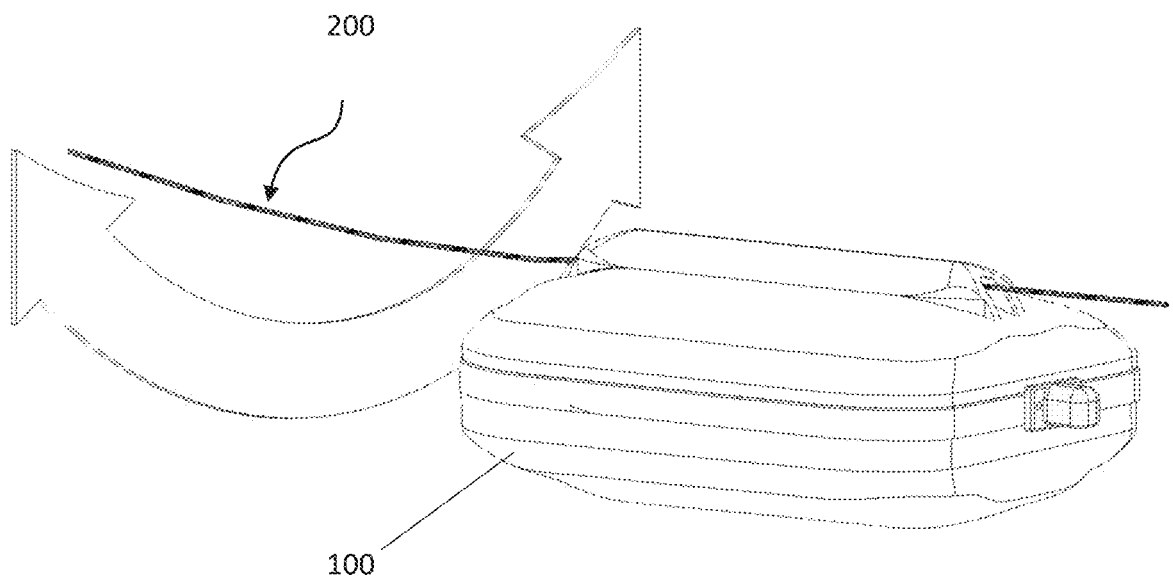
FIG. 1 is a schematic perspective view of a first embodiment of a device to be attached to an overhead power line for the purpose of manipulating movement of the overhead power line.

FIG. 1 illustrates a device 100 to be attached to an overhead power line 200 for the purpose of manipulating movement of the overhead power line 200.

As already mentioned in the Background section, an overhead power line arrangement includes of a number of power lines or conductors, usually three or multiples of three, which are suspended by towers, pylons or poles arranged at intervals along the power lines.

Although the towers, pylons or poles have not been shown in FIG. 1, it will be understood that the device 100 during use, is arranged on a portion of the power line 200 between two towers, pylons or poles. Typically, the device 100 will be arranged halfway or substantially halfway between two adjacent towers, pylons or poles.

In a typical power line arrangement wherein a plurality of separate power lines are suspended by the towers, pylons or poles, one device 100 will typically be arranged on each of the power lines.

Figure 2:
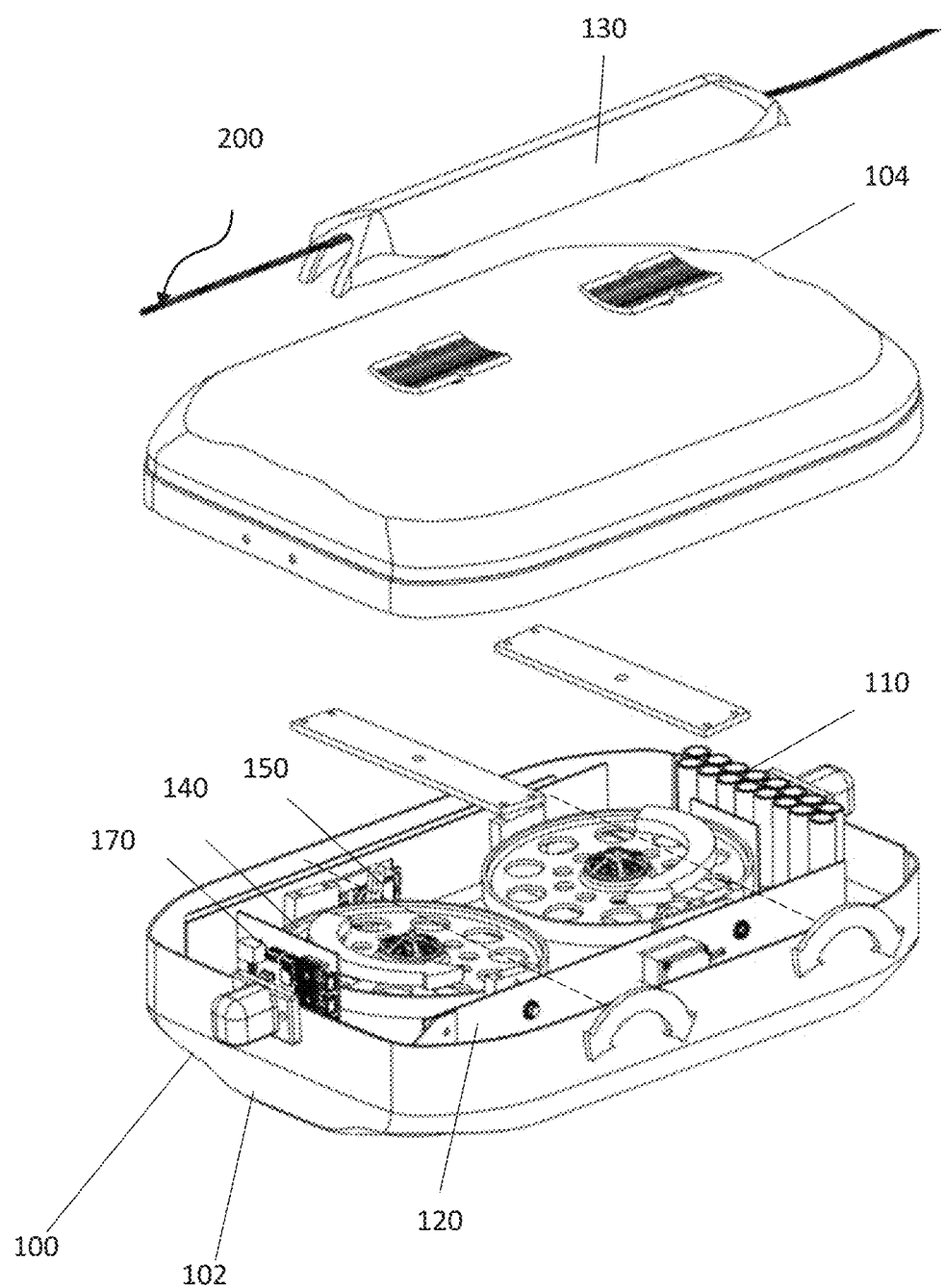
FIG. 2 is a schematic exploded perspective view that illustrates principles of a first embodiment of the device.

FIG. 2 is a schematic exploded perspective view that illustrates principles of a first embodiment of the device 100.

As illustrated, the device 100 comprises an electric power source 110; a base 120, which defines a base plane. The base and the internal components is surrounded by an external housing, which may include a lower housing portion 102 and a top housing portion 104, which are secured along an upper rim on the lower housing portion 102 and a lower rim on the upper housing portion 104 to form a watertight and rugged housing. The housing portions 102, 104 may, e.g., be made of a thermoplastic polymer material such as polycarbonate, in particular an UV stable polycarbonate. The housing portions 102, 104 may advantageously be formed with a smooth and slippery outer surface, in order to avoid fastening of snow and/or ice during use in frosty and humid conditions.

A clamp 130 is secured relatively to the base, usually indirectly via the housing. Advantageously, the clamp 130 is mounted on the upper part of the top housing portion 104, which is again attached to the lower housing portion 102 and the base 120. The clamp 130 is configured to be attached to a section of the overhead power line 200, thus securing the device 100 to the power line 200.

The device 100 further comprises a rotary flywheel 140. The flywheel has a rotational axis. An actuator 150 is arranged to adjust the rotational axis of the flywheel 140 in dependency of an actuator control signal.

The device 100 further comprises an electric motor, not visible in FIG. 2, which is arranged to rotate the flywheel 140 about the rotational axis in dependency of a motor control signal which is supplied to the electric motor.

The flywheel 140 is rotatable about its axis and will store rotational energy by its rotation about its axis. The flywheel resists changes in rotational speed by its moment of inertia, resulting in a gyroscopic effect. In use, when rotating, the flywheel 140 provides the function of stabilizing the power line. When the flywheel's rotational axis is changed, the gyroscopic effect of the rotating flywheel will counteract the change. The stored energy of the rotating flywheel will generate a torque or force perpendicular to the rotational axis.

In the embodiment shown in FIG. 2, the device 100 comprises two flywheels 140, two respective electric motors and two respective actuators 150.

The device further comprises an acceleration sensing device, secured relatively to the base, providing an acceleration signal. The acceleration sensing device may advantageously include a 3-axis accelerometer or a 3-axis gyroscope. The acceleration sensing device may be secured directly to the base, or it may be secured indirectly to the base, for instance as part of a controller device 170, described in further detail below, which is directly secured to the base.

The device further comprises a controller device 170, which is arranged to receive the acceleration signal provided by the acceleration sensing device as an input signal, and to provide the motor control signal and the actuator control signal as output signals. The controller device 170 may include a processor device and a memory, containing processing instructions to cause the processor device to operate according to functionality described herein. The controller device may also include memory for containing volatile data, a bus, necessary I/O peripherals, etc. In an aspect, the controller device may include a microcontroller.

Consistent with principles of the invention, the controller device 170 is configured to operate in an overhead power line stabilizing mode.

In the overhead power line stabilizing mode, the controller device 170 is configured to calculate the motor control signal and the actuator control signal in dependency of the acceleration signal in such a way as to minimize the acceleration signal.

Further details of the calculation performed by the controller device 170 in the overhead power stabilizing mode have been explained below with reference to FIG. 3.

In an advantageous embodiment, the controller device 100 is further configured to operate in an ice removal mode, which is different from the overhead power line stabilizing mode, i.e., the ice removal and stabilizing modes represent different time intervals in the operation of the device 100.

In the ice removal mode, the controller device 100 is configured to calculate the motor control signal and the actuator control signal in dependency of the acceleration signal in such a way as to cause fluctuations in the acceleration measured by the acceleration sensing device.

Further details of the calculation performed by the controller device 170 in the ice removal mode have been explained below with reference to FIG. 3.

Figure 3:
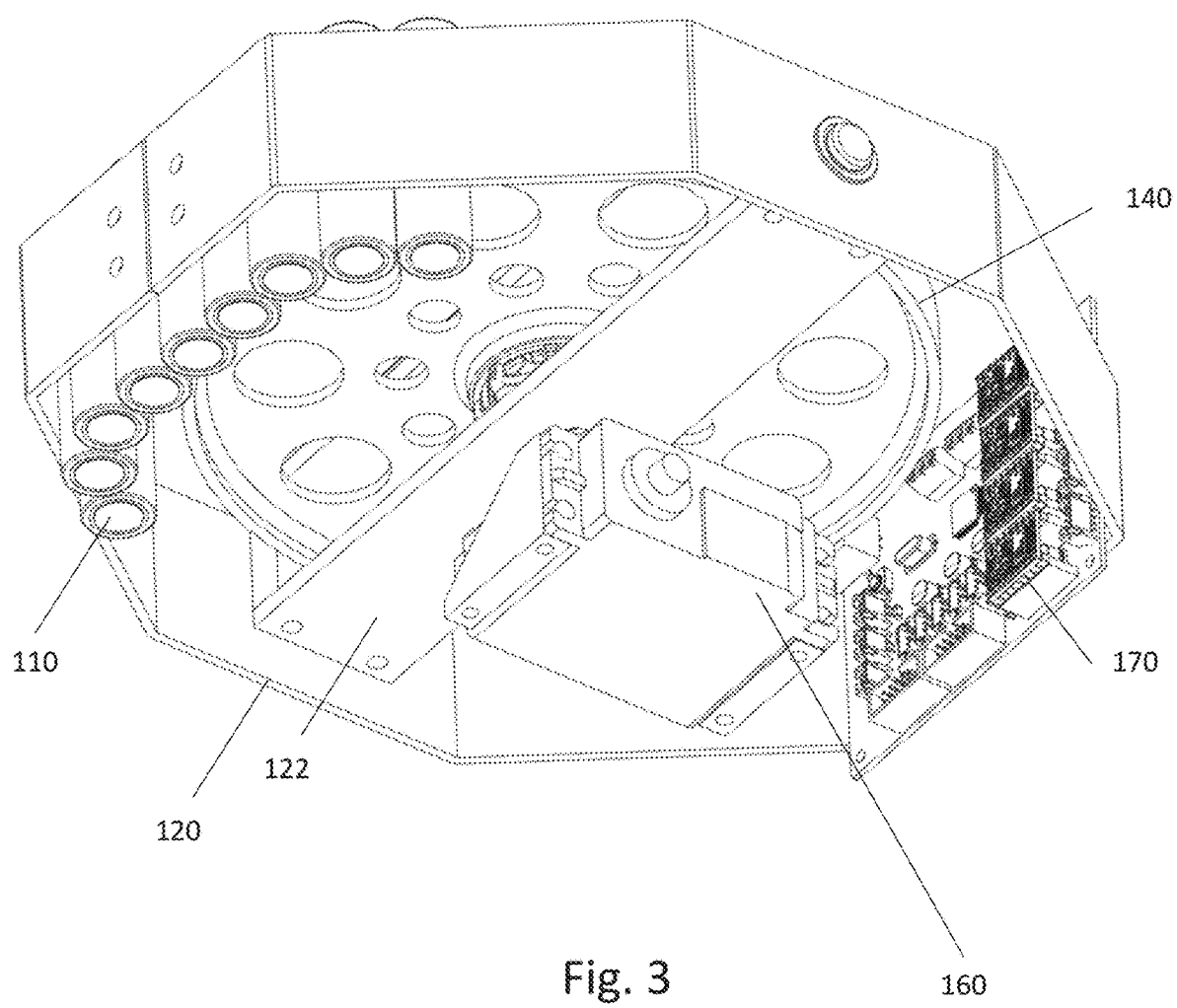
FIG. 3 is a schematic perspective view that illustrates principles of a second embodiment of the device.

FIG. 3 is a schematic perspective view that illustrates principles of a second embodiment of the device 100 to be attached to an overhead power line for the purpose of manipulating movement of the overhead power line.

In FIG. 3, the housing, i.e. the lower portion 102 and the top portion 104 of the housing, as well as the clamp 130 and the power line 200, have not been illustrated.

Instead, FIG. 3 illustrates the base 120, which may advantageously be formed as a polygonal frame, such as the octagonal shape shown. The frame may advantageously be formed of an octagonally shaped, endless metallic strip, e.g. of lightweight aluminum. A bridge or beam 122 is attached to two opposite sides of the octagonally shaped frame in order to stiffen the frame and provide a support for the rotatable flywheel 140.

In the embodiment of FIG. 3, only one flywheel is arranged. The flywheel 140 has a rotational axis. One actuator 150 (not illustrated in FIG. 3) is arranged to adjust the rotational axis of the flywheel 140 in dependency of an actuator control signal. An electric motor 160 is arranged to rotate the flywheel 140 about the rotational axis in dependency of a motor control signal. As shown in FIG. 3, the motor 150 is arranged below the flywheel 140. FIG. 3 also shows batteries which may be included in a power source 110. FIG. 3 also shows a controller device 170 in the form of a printed circuit board provided with controller circuitry, secured to an inner surface of the polygonal frame or base 140.

The controller device 170 is configured to operate in an overhead power line stabilizing mode.

In the overhead power line stabilizing mode, the controller device 170 is configured to calculate the motor control signal and the actuator control signal in dependency of the acceleration signal in such a way as to minimize the acceleration signal.

To this end, the controller device 170 may operate as a conventional controller, e.g. a P, PI, PD or PID controller, to calculate the motor control signal. Alternatively, the controller device 170 may operate as a Kalman filter.

In an advantageous embodiment, the controller device 100 is further configured to operate in an ice removal mode, which is different from the overhead power line stabilizing mode, i.e., the ice removal and stabilizing modes represent different time intervals in the operation of the device 100.

In the ice removal mode, the controller device 100 is configured to calculate the motor control signal and the actuator control signal in dependency of the acceleration signal in such a way as to cause fluctuations in the acceleration measured by the acceleration sensing device.

Figure 4:
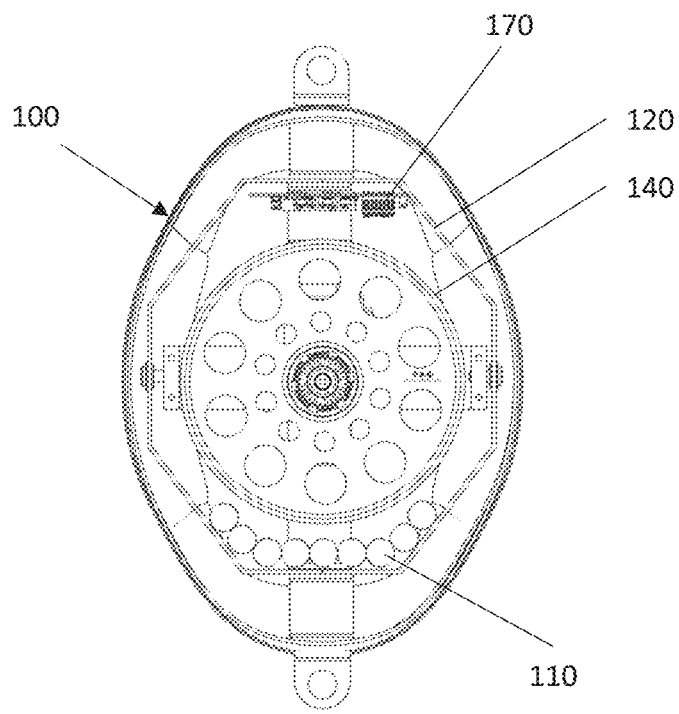
FIG. 4 is a schematic top sectional view illustrating further principles of the second embodiment of the device.

FIG. 4 is a schematic top sectional view illustrating further principles of the second embodiment of the device, i.e. the embodiment with only one flywheel 140. The octagonal frame 120 is shown, with the controller device 170 attached to an inner surface of the frame 120, and a power source 110 including batteries are provided at other portions of the inner surface of the frame 140. The surrounding housing has also been schematically shown.

Figure 5:
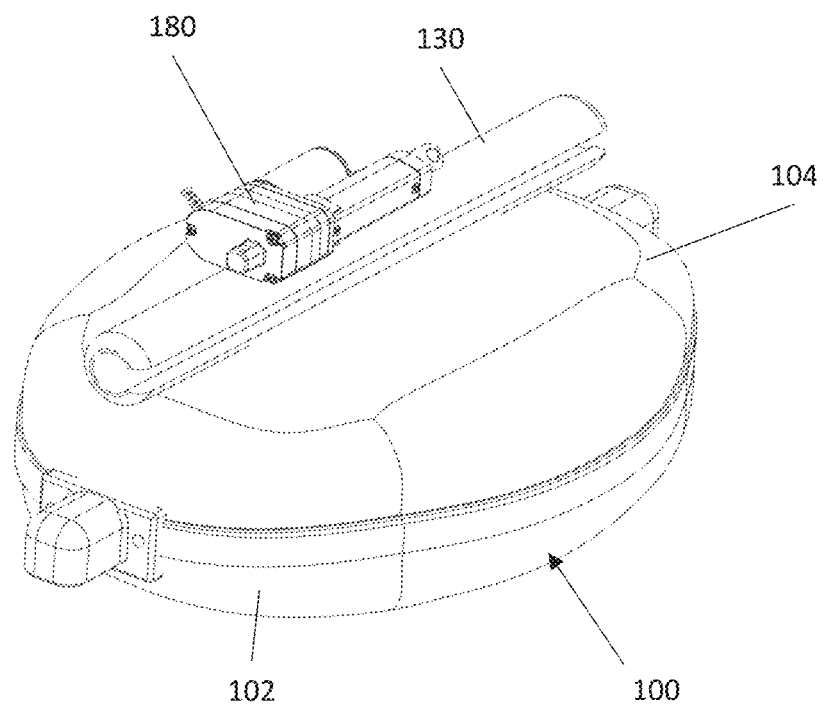
FIG. 5 is a schematic perspective view illustrating further principles of the second embodiment of the device.

FIG. 5 is a schematic perspective view illustrating further principles of the second embodiment of the device, i.e. the embodiment with only one flywheel 140. The lower portion 102 and the top portion 104 of the surrounding housing have been illustrated. The clamp 130, arranged on top of the top portion 104 of the housing has been illustrated as including a locking device 180. The locking device 180 is configured to lock the device 100 to the overhead power line. The locking device 180 typically includes a locking actuator which is controllable by the controller device 170, hence, the controller device 170 may receive or calculate a signal which is able to lock or unlock the locking device.

In any of the disclosed embodiments, the electric power source may advantageously include an inductive coupler, which may be integrated with the locking device 180, which is arranged to provide electric power from AC carried by the overhead power line 200 The electric power source advantageously also includes a power converter (not illustrated). In such aspects, the electric power source 110 may advantageously further comprise a rechargeable battery device, such as the plurality of rechargeable batteries illustrated as cylindrical elements in FIGS. 2, 3 and 4.

In any of the disclosed embodiments, the device may advantageously further comprise a communication device connected to the controller device 170. The communication device may provide wireless communication with a base station, which may be arranged externally to the device 100, for instance on the ground or on a power line tower, pillar or pole.

As an example, if the controller 170 is detecting that a failure situation, the controller may send a notification via the communication device. Such a failure situation may be that a sensing device has failed, that the batteries does not charge or battery power is below or above predetermined threshold values etc.

In any of the disclosed embodiments, the device may advantageously further comprise a temperature sensor device. The temperature sensor may advantageously be arranged in the clamp 130, and it may be arranged to measure a temperature of the overhead power cable 200. In this aspect, the controller device 170 is advantageously arranged to receive a temperature signal from the temperature sensor device. Again, if the measured temperature is above a predetermined threshold value, a notification may be sent via the communication device. Typically, a power cable temperature above 80° C. is an indication of an undesired situation in the power distribution network. Hence, the device may also be used to monitor the power distribution network.

The controller 170 may itself comprise or be connected to a further temperature sensor for measuring a parameter representative of the air temperature outside of the housing. This temperature sensor may be used to detect situations where icing may occur and hence when ice removal mode should start.

In any of the disclosed embodiments, the device 100 may further comprise an ice formation detector. In this aspect, the controller device is advantageously arranged to receive an ice formation detector signal from the ice formation detector.

In any of the disclosed embodiments, the device 100 may further comprise a distance measurement device, which is arranged to measure a vertical distance between the device 100 and the ground. In this aspect, the controller device is advantageously arranged to receive a distance measurement signal from the distance measurement device. If the distance to the ground is outside a predetermined range, this may be an indication of ice/snow and the ice removal mode may start based on signals from this distance measurement device. If the ice removal mode does not improve the situation, a notification may be sent via the communication device, as this may indicate that a tower, pylon or pole is damaged or that a tree has fell onto the power cable.

In any of the disclosed embodiments, the device 100 may further comprise a humidity sensor for sensing the relative humidity of the air outside of the housing. This humidity sensor may be used to detect situations where icing may occur and hence when ice removal mode should start.

The invention claimed is:

1. A device to be attached to an overhead power line for the purpose of manipulating movement of the overhead power line, the device comprising:
    an electric power source;
    a base, defining a base plane;
    a clamp, secured relatively to the base, to be attached to a section of the overhead power line;
    a flywheel, having a rotational axis;
    an actuator, arranged to adjust the rotational axis of the flywheel in dependency of an actuator control signal;
    an electric motor, arranged to rotate the flywheel about the rotational axis in dependency of a motor control signal;
    an acceleration sensing device, secured relatively to the base, providing an acceleration signal; and
    a controller device, arranged to receive the acceleration signal and to provide the motor control signal and the actuator control signal, the controller device being configured to:
        in an overhead power line stabilizing mode, calculating the motor control signal and the actuator control signal in dependency of the acceleration signal in such a way as to minimize the acceleration signal,
        in an ice removal mode, calculating the motor control signal and the actuator control signal in dependency of the acceleration signal in such a way as to cause fluctuations in the acceleration measured by the acceleration sensing device;
        wherein the ice removal mode is different from the overhead power line stabilizing mode.

2. The device according to claim 1, comprising one flywheel, one electric motor and one actuator.

3. The device according to claim 1, comprising two flywheels, two respective electric motors and two respective actuators.

4. The device according to claim 1, further comprising an external housing, the clamp being arranged on an upper part of the external housing.

5. The device according to claim 4, wherein the clamp includes a locking device configured to lock the device to the overhead power line, the locking device including a locking actuator which is controllable by the controller device.

6. The device according to claim 1, wherein the acceleration sensing device includes a 3-axis accelerometer or a 3-axis gyroscope.

7. The device according to claim 1, wherein the electric power source includes an inductive coupler, arranged to provide electric power from AC carried by the overhead power line, and a power converter.

8. The device according to claim 7, wherein the electric power source further comprises a rechargeable battery device.

9. The device according to claim 1, further comprising a communication device connected to the controller device, providing wireless communication with a base station.

10. The device according to claim 1, further comprising a temperature sensor device in the clamp, arranged to measure a temperature of the overhead power cable, and wherein the controller device is arranged to receive a temperature signal from the temperature sensor device.

11. The device according to claim 1, further comprising an ice formation detector, and wherein the controller device is arranged to receive an ice formation detector signal from the ice formation detector.

12. The device according to claim 1, further comprising a distance measurement device, measuring a vertical distance between the device and the ground, and wherein the controller device is arranged to receive a distance measurement signal from the distance measurement device.

* * * * *